No. 871,406. PATENTED NOV. 19, 1907.
B. HOLLINSHEAD.
ANIMAL FETTER.
APPLICATION FILED MAY 29, 1907.
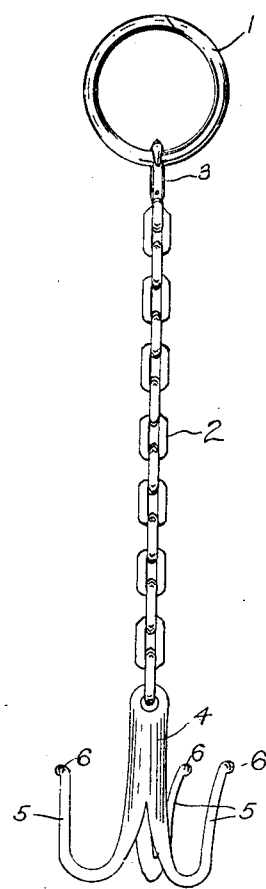
Witnesses
W. M. Haskell.
E. C. Brown
Inventor
Burton Hollinshead.
By Walter N. Haskell,
his Attorney

UNITED STATES PATENT OFFICE.

BURTON HOLLINSHEAD, OF FULTON, ILLINOIS.

ANIMAL-FETTER.

No. 871,406.　　　　　Specification of Letters Patent.　　　　Patented Nov. 19, 1907.

Application filed May 29, 1907. Serial No. 376,227.

*To all whom it may concern:*

Be it known that I, BURTON HOLLINSHEAD, a citizen of the United States, residing at Fulton, in the county of Whiteside and State of Illinois, have invented certain new and useful Improvements in Animal-Fetters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to animal fetters, and is specially adapted to be used with such animals as are accustomed to be provided with rings in their noses, and more particularly with male animals of the bovine species.

The chief purpose of the device is to prevent such animals from breaking down wire fences, or forcing their way through the same.

My invention is simple in form, can be cheaply produced, and is effective in operation. The particular construction and manner of use thereof will be more fully set forth in the following specification, reference being had to the drawing accompanying the same, in which one of my devices is fully shown.

1 represents a ring, of the kind which are adapted to be secured in the nose of an animal, and 2 a short chain, capable of being attached to said ring by means of a snap-hook 3 at one end thereof. Secured to that end of the chain 2 opposite to the hook 3 is a metal block 4, integral with which is a plurality of radially disposed prongs or hooks 5, provided on their ends with knobs 6.

With the device in position in the ring 1, and the ring in the nose of the animal, any attempt of such animal to force its head through or over the wires of a fence will be successfully checked by reason of one or more of the hooks 5 engaging the wire below the animal's head. Upon the head of the animal being withdrawn the hooks will disengage themselves and release the animal. It is preferred to have the chain 2 of such a length as will prevent more than the head of the animal being projected through or over the wires of the fence.

My invention is intended to be used when the animal is in the pasture, or other place surrounded by a fence of the kind mentioned, and is therefore constructed so as to be detached from the animal at other times. When the animal is feeding in the pasture the hooks will drag lightly over the ground, and will be prevented from becoming caught therein by means of the knobs 6 on the ends of the hooks.

In order to be effective, it is necessary to provide three or more of the hooks 5, whereby the engagement of the wire by at least one of such hooks is assured.

It is desired to have the device constructed as lightly as possible, consistent with the amount of strength which it is necessary for it to possess.

What I claim as my invention, and desire to secure by Letters Patent of the United States, is:

1. A device of the class named, comprising a central block; a plurality of radially disposed hooks secured thereto, and provided on their ends with knobs; and means for flexibly attaching said block to a ring in the nose of the animal, substantially as shown and described.

2. A device of the class named, comprising a block 4; a plurality of hooks 5, extending radially from one end of said block, and provided at their ends with small knobs 6; and a short chain 2, attached to that end of the block 4 opposite to said hooks, and adapted to be removably secured at its free end to a ring in the nose of an animal, substantially as shown and set forth.

In testimony whereof, I affix my signature, in presence of two witnesses.

BURTON HOLLINSHEAD.

Witnesses:
　LAWSON BARBER,
　DANIEL HOLLINSHEAD.